June 28, 1955  M. C. YEASTING  2,712,082
ELECTRICAL CONTROL CIRCUIT
Filed Dec. 31, 1952
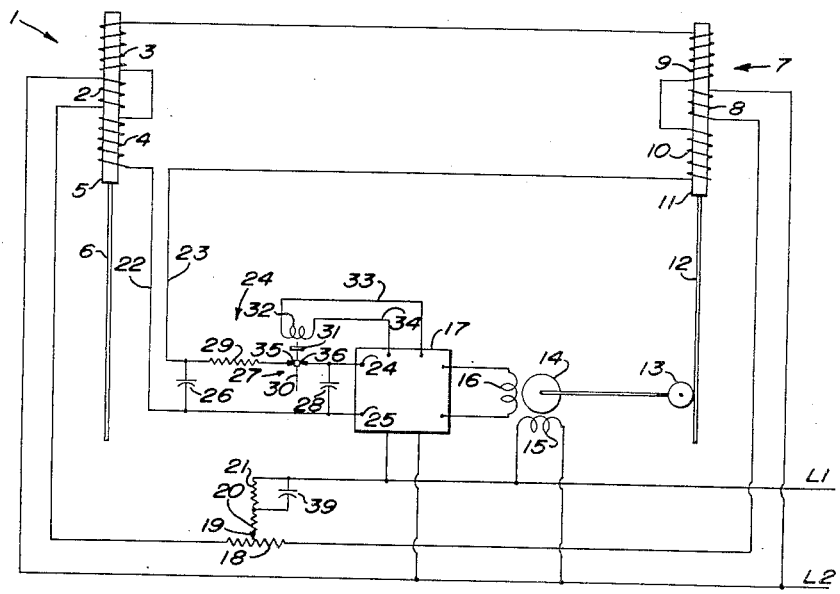
Fig. I
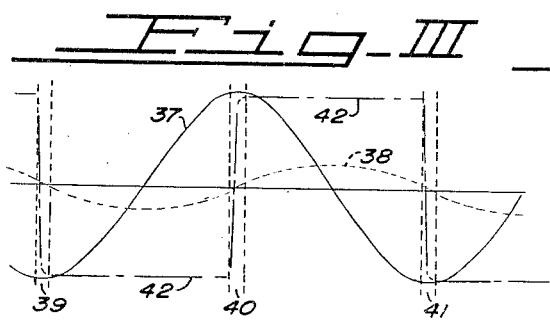
Fig. III
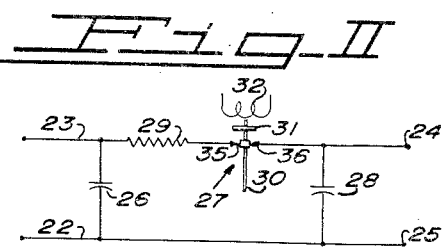
Fig. II
INVENTOR.
MAYNARD C. YEASTING
BY
ATTORNEYS United States Patent Office 2,712,082
Patented June 28, 1955

2,712,082

ELECTRICAL CONTROL CIRCUIT

Maynard C. Yeasting, Elmore, Ohio, assignor to Toledo Scale Company, Toledo, Ohio, a corporation of New Jersey Application December 31, 1952, Serial No. 328,851

5 Claims. (Cl. 307—133)

This invention relates to electrical control systems and in particular to an improved circuit for separating a desired signal of a particular frequency and phase from an undesired signal or interfering signal of the same frequency and of different phase.

It it often necessary in servo mechanism systems and electrical circuit systems to separate a desired signal from larger undesired signals. This is particularly true when suppressed carrier current signals are employed. The suppressed carrier type of signal results when a pick-up device is excited with alternating current and is arranged to deliver an alternating current output voltage the amplitude of which varies with the displacement being indicated and the phase of which varies with the direction of the displacement. When the displacement is zero the signal voltage should also be zero. However, it often happens that a residual carrier frequency voltage in phase quadrature with the useful signal voltage remains and such quadrature voltage may be sufficient to introduce serious errors or seriously reduce the sensitivity of the over-all system. This effect is very likely to occur whenever the desired signal voltage is the difference between two relatively large carrier frequency voltages one of which increases with positive error or positive displacement of the device being measured while the other decreases with positive displacement. Small differences in phase angle of the two relatively large voltages prevents exact balancing and results in an appreciable quadrature voltage when the amplitudes of the two voltages are equal.

The principal object of this invention is to provide a simple circuit that is capable of selectively accepting the desired signal voltage while rejecting signals corresponding to the quadrature votlage.

Another object of the invention is to provide a signal translating means suitable for operating on extremely minute signals and rejecting signals having certain phase relations.

A still further object of the invention is to provide a servomechanism data transmitting circuit in which high accuracy may be obtained without requiring extremely exact correspondence of phase angle of the various generated voltages of the pick-up and follower elements.

More specific objects and advantages are apparent from the following description of a preferred form of the invention.

According to the invention a momentary contact switch is employed to momentarily and intermittently connect an amplifier input circuit to a signal circuit, said switch being operated in synchronism with the carrier voltage impressed on the signal circuit and being phased to make contact at the instants that the undesired carrier current voltage passes through zero. The desired carrier current voltage is usually a maximum at that instant but it is not necessary that it be a maximum.

A control circuit employing the invention is illustrated in the accompanying drawings.

In the drawings:

Figure I is a schematic diagram of a follow-up mechanism or a data transmitting system having an electrical data transmitting circuit constructed according to the invention.

Figure II is a schematic diagram of the signal selecting portion of the circuit shown in Figure I.

Figure III is a drawing in the nature of an oscillogram illustrating the theory of operation of the improved circuit.

These specific figures and the accompanying description are intended merely to illustrate the invention but not to impose limitations on its scope.

For purposes of illustration the improved signal selecting circuit is shown in connection with a data transmitting system employing differential transformers. Such a data transmitting system may consist of a transmitting differential transformer 1 having a primary winding 2 and a pair of oppositely wound secondary windings 3 and 4. The transformer includes a movable core 5 that is connected by a stem 6 to a device whose position is to be indicated. The transformer is designed so that movement of the core 5 varies the coupling between the primary winding 2 and the secondary windings 3 and 4. When the core is in the center of its range of travel the coupling to the two secondaries is the same so that the secondary voltages cancel each other and no net output voltage results.

The transmitting differential transformer is electrically connected to a receiving transformer 7 having a primary winding 8, secondary windings 9 and 10, and a movable core 11 which through a stem 12 and driving mechanism 13 is connected to a motor 14. The motor 14 is provided with a field winding 15 connected between alternating current power lines L1 and L2 and a control winding 16 that is energized by the output voltage of an amplifier 17.

The primary windings 2 and 8 of the differential transformers are connected in parallel to the power line L2 and each in series with a portion of an adjusting resistor 18 are connected to a slider 19 of the resistor which in turn is connected through resistors 20 and 21 to the power line L1. Adjustment of the slider 19 thus serves to increase the current through one primary while simultaneously decreasing the current through the other primary.

The secondary windings 3, 4, 9 and 10 of the transformers 1 and 7 are connected in series such that each winding is connected in voltage opposition to the other secondary winding of the same transformer and to the corresponding winding on the other transformer. Thus, the secondary winding 4 is in series aiding relation with the secondary winding 9 and is in opposition to the secondary windings 3 and 10. The net voltage, the difference between the voltages generated in the windings 3 and 4 less the difference between the voltages generated in the windings 9 and 10 is applied through leads 22 and 23 to a signal selecting circuit 24 connected between the signal leads 22 and 23 and amplifier input terminals 24 and 25.

The signal selecting circuit 24 comprises a shunt condensor 26 connected between the leads 22 and 23 and serving to reduce the apparent impedance of the signal circuit of the transformers; a momentary contact switch 27; and a condenser 28 connected between the amplifier input terminals. A resistor 29 connected in series between the signal lead 23 and the momentary contact switch 27 serves to limit the instantaneous current flow from the condenser 26 to the condenser 28 when the switch contacts close.

The momentary contact switch 27 may be any type of rotating or vibrating switch that can be adapted to close the circuit between the condensers 26 and 28 momentarily twice each cycle of the carrier current voltage present on the leads 22 and 23. In the system shown the carrier frequency is the same as the frequency of the power supplied through the leads L1 and L2. These contacts may be a commutator driven by a synchronous motor or they may be contacts operating with a vibrating reed that is driven by alternating current power. The vibrating reed type of momentary contact switch is preferred because of its sensitivity and availability. Any of the so-called "vibrating reed choppers" having make-before-break contacts are suitable for use as the switch. A suitable "chopper" is shown in U. S. Patent No. 2,423,524.

A vibrating reed chopper such as is commonly used in electrical instruments for converting direct current signals in the order of microvolts to alternating current signals to be amplified comprises a reed 30 having a magnetized armature 31 cooperating with a driving coil 32 that is energized through leads 33 and 34 from a low voltage power winding of the amplifier 17. Such choppers are ordinarily constructed so that their signal carrying contacts 35 and 36 each make contact with the reed 30 during slightly more than one half the time, i. e., both contacts 35 and 36 simultaneously contact the reed when the reed 30 is in its midposition. As it vibrates from side to side during normal operation the reed makes contact with one of the contacts durings one half cycle and makes contact with the other during the other half cycle with a very slight overlap as it moves from one side to the other. In the selecting circuit 34, shown in Figure I and also in Figure II, the condenser 28 is charged nearly to the voltage of the condenser 26 during the brief interval of time that the contacts 35 and 36 simultaneously contact the reed 30. For the best results with the circuit the capacity of the condenser 28 is made approximately one per cent of the capacity of the condenser 26 and the resistor 29 and condenser 28 has a time constant ranging from 1/10 to 1/3 the time interval that the contacts 35 and 36 are simultaneously contacting the reed 30. Figure III, in the nature of an oscillogram, illustrates the voltages and timing or phasing that is required for successful operation of the improved signal selecting circuit. As shown in Figure III, a sine curve 37 represents the signal voltage on the leads 22 and 23 when the movable cores 5 and 11 are not correspondingly positioned. The amplitude of the curve 37 varies according to the amount of misalignment between the movable cores and varies from positive to negative according to the direction of the misalignment. Simultaneously a quadrature voltage represented by a co-sine curve 38 may exist and this voltage may vary both in amplitude and phase as the transformer cores 5 and 11 are moved from one end of their travel to the other. This quadrature voltage represented by the line 38 is usually the result of imperfections in the transformers or in the phase of the voltages that are delivered by the transformers as the secondary circuits are loaded by resistors to vary the characteristics of the transformers. The voltages represented by the curves 37 and 38, however, are not proportionally related since either may be present without the other and under certain conditions the quadrature voltage 38 may be sufficiently large to overload the amplifier before the signal voltage represented by the curve 37 is completely balanced.

According to the invention the phase of the signal voltage represented by the line 37 and the quadrature voltage represented by the line 38 is varied by adjusting the size of a condenser 39 and the resistor 21 until the quadrature voltage 38 is phased such that its point of zero voltage, where the curve 38 crosses the axis, coincides, with the time that the contacts 35 and 36 are simultaneously closed. The timing of the contacts is controlled by the characteristics of the reed and the phase of the current in the driving coil 32. The intervals of time that the contacts are simultaneously closed are indicated by three pairs of parallel vertical dotted lines 39, 40, and 41 of Figure III. The desired signal voltage reaches its maximum value, positive or negative, during these same brief time intervals and thus the condenser 28 is alternatively charged positive or negative to substantially the maximum value of the desired signal voltage. The effective signal appearing on the condenser 28, which is fed into the amplifier 17, is substantially a square wave represented by the dot-dash line 42 which is displaced 1/4 cycle behind the accepted signal voltage and which has an amplitude substantially equal to the maximum amplitude of the signal voltage.

In this circuit as the motor 14 drives the movable core 11 into a position corresponding to the core 5 of the transmitting transformer the desired signal voltage represented by the curve 37 decreases to zero while the interfering signal or quadrature signal represented by the curve 38 may still be of considerable magnitude. However, this interfering signal does not affect the operation of the amplifier because it is substantially zero at the time the contacts are closed and thus does not appear in the output of the selecting circuit.

Various modifications may be made in the various components of the improved circuit without departing from the scope of the invention.

Having described the invention, I claim:

1. An electrical signal transmitting and selecting circuit comprising, in combination, an input circuit, an output circuit including a shunt capacitor, said input circuit carrying a useful alternating current signal and an interfering alternating current signal, and a momentary contact switch operating in synchronism with said alternating current signals and phased to make contact at voltage zero of said interfering signal, said switch being connected to couple said input and output circuits during the brief intervals that it is closed.

2. An electrical signal transmitting and selecting device comprising, in combination, an input circuit, an output circuit including a shunt capacitor, said input circuit carrying a useful alternating current signal and an interfering quadrature signal, a momentary contact switch, and means for operating said switch in synchronism with the alternating current signal and in phase such that its contacts are closed as the quadrature signal passes through zero.

3. An electrical signal transmitting and selecting device comprising, in combination, an input circuit, an output circuit including a shunt capacitor, a single pole switch comprising a first and a second contact and a movable contact that alternately contacts the first and second contacts and that contacts both simultaneously as it moves from one condition to the other, said first contact being connected to said input circuit, said second contact being connected to said output circuit, and means for operating said switch in phase with a signal in said input circuit.

4. An electrical signal transmitting and selecting device comprising, in combination, an input circuit carrying an alternating current signal, an output circuit of high impedance, and a momentary contact switch for connecting said input circuit to said output circuit during brief intervals of time as the alternating current signal reaches its maximum values.

5. An electrical signal transmitting and selecting device comprising, an input circuit carrying a variable amplitude alternating current signal, an output circuit of high impedance, and a vibrating switch operating at the same frequency as the alternating current signal, said switch having a first contact connected to said input circuit, a second contact connected to the output circuit, and a vibrating contact that alternately contacts each of the other contacts with one contact making before the other breaks, whereby the input and output circuits are interconnected momentarily once during each half cycle as the signal voltage reaches its maximum positive and negative voltage.

References Cited in the file of this patent
UNITED STATES PATENTS 2,593,950    Williams, Jr.     Apr. 22, 1952
2,622,192    Tarpley     Dec. 16, 1952